(12) United States Patent
Wilbon

(10) Patent No.: US 11,684,041 B2
(45) Date of Patent: Jun. 27, 2023

(54) CONTROL HANDLE FOR AN ANIMAL COLLAR OR HARNESS

(71) Applicant: Calvin Wilbon, Little Rock, AR (US)

(72) Inventor: Calvin Wilbon, Little Rock, AR (US)

( * ) Notice: Subject to any disclaimer, the term of this patent is extended or adjusted under 35 U.S.C. 154(b) by 174 days.

(21) Appl. No.: 16/697,864

(22) Filed: Nov. 27, 2019

(65) Prior Publication Data
US 2021/0153475 A1     May 27, 2021

(51) Int. Cl.
*A01K 27/00*     (2006.01)

(52) U.S. Cl.
CPC ............ *A01K 27/00* (2013.01); *A01K 27/005* (2013.01)

(58) Field of Classification Search
CPC ...... A45F 2005/1013; A45F 2005/1053; A45F 2005/1073; A45F 2005/106; A45F 5/1046; A45F 5/1026; A45F 2005/1006; A45C 2013/223; A45C 13/22; A01K 27/001–009
See application file for complete search history.

(56) References Cited

U.S. PATENT DOCUMENTS

| | | | | |
|---|---|---|---|---|
| 30,775 A | * | 11/1860 | Taylor ................. | A01K 27/006 54/20 |
| 349,707 A | * | 9/1886 | Gardiner .............. | A01K 27/006 54/20 |
| 3,332,398 A | * | 7/1967 | Mintz .................. | A01K 27/003 119/797 |
| 4,004,722 A | * | 1/1977 | Olivier ................. | A45F 5/1046 D9/434 |
| 4,530,309 A | * | 7/1985 | Collins ................. | A01K 13/00 119/863 |
| 4,655,172 A | * | 4/1987 | King .................... | A01K 27/002 119/792 |
| 4,787,340 A | * | 11/1988 | Kirtley ................. | A01K 27/005 119/792 |
| 4,804,218 A | * | 2/1989 | Hilliard ................ | B63C 11/22 294/157 |
| 4,966,279 A | * | 10/1990 | Pearcy ................. | A45C 3/00 441/32 |
| D320,696 S | * | 10/1991 | Butler .................. | D3/259 |
| 5,099,800 A | * | 3/1992 | Fitzpatrick ........... | A01K 25/00 119/711 |
| 5,146,875 A | * | 9/1992 | Bolt ..................... | A01K 27/002 119/654 |
| 5,297,835 A | * | 3/1994 | Wengler .............. | A01K 15/00 294/146 |

(Continued)

*Primary Examiner* — Monica L Perry
(74) *Attorney, Agent, or Firm* — Timothy A. Hodgkiss; Buckingham Doolittle Burroughs

(57) ABSTRACT

A control handle for selective attachment to an animal collar or harness includes a loop member having one or more retention members attached thereto. In addition, a grasping member is provided by the loop member. During use, the loop member of the control handle is brought under an attachment section provided by the animal collar or harness that is positioned around the animal's neck, and is pulled partially around the attachment section of the collar or harness to form a pair of grasping loops for the handler of the animal to hold. The retention members further retain the control handle to the attachment section of the collar or harness. As a result, the control handle converts the collar or harness into a working animal collar or harness.

15 Claims, 4 Drawing Sheets

(56) References Cited

U.S. PATENT DOCUMENTS

| | | | | |
|---|---|---|---|---|
| 5,511,515 A * | 4/1996 | Brown | A01K 27/002 | 119/771 |
| 5,542,730 A * | 8/1996 | Riesselmann | A62C 33/00 | 294/157 |
| 5,558,382 A * | 9/1996 | Wengler | A45F 5/10 | 294/157 |
| 5,632,235 A * | 5/1997 | Larsen | A01K 27/002 | 119/856 |
| 5,695,234 A * | 12/1997 | Coticchio | A45F 5/1026 | 294/158 |
| 5,806,467 A * | 9/1998 | Arakawa | A01K 27/003 | 119/771 |
| 5,894,817 A * | 4/1999 | Manuel | A01K 1/0263 | 119/497 |
| 6,049,953 A * | 4/2000 | McCay | F16B 45/00 | 24/302 |
| 6,161,505 A * | 12/2000 | Noguero | A01K 27/002 | 119/792 |
| 6,314,915 B1 * | 11/2001 | Pope | A01K 27/002 | 119/712 |
| 6,694,923 B1 * | 2/2004 | Fouche | A01K 27/005 | 119/792 |
| D650,586 S * | 12/2011 | Hutcheson | D3/316 | |
| D675,023 S * | 1/2013 | Colgan | D3/327 | |
| 8,366,163 B1 * | 2/2013 | Harris | A45F 3/14 | 280/304.5 |
| 9,004,016 B2 * | 4/2015 | Stratton | A01K 27/002 | 119/850 |
| 9,339,086 B2 * | 5/2016 | Hill | A44B 11/04 | |
| D759,906 S * | 6/2016 | Landry | D30/151 | |
| 9,781,905 B2 * | 10/2017 | Maurer | A01K 27/003 | |
| 10,238,091 B2 * | 3/2019 | Hoffman | A01K 15/027 | |
| 10,939,667 B2 * | 3/2021 | Kruse | A01K 27/005 | |
| D919,899 S * | 5/2021 | Lopez, Jr. | D30/152 | |
| 2004/0010887 A1 * | 1/2004 | Cohen | B65G 7/12 | 16/431 |
| 2005/0263101 A1 * | 12/2005 | Jenny | A01K 27/002 | 119/792 |
| 2006/0065210 A1 * | 3/2006 | Tozawa | A01K 27/005 | 119/863 |
| 2006/0156997 A1 * | 7/2006 | Moore | A01K 27/002 | 119/792 |
| 2007/0084893 A1 * | 4/2007 | Godshaw | B25H 3/006 | 224/257 |
| 2008/0276880 A1 * | 11/2008 | Swisher | A01K 27/002 | 119/728 |
| 2009/0200347 A1 * | 8/2009 | Edralin | A45F 5/00 | 224/191 |
| 2010/0122667 A1 * | 5/2010 | Horgan | A01K 27/002 | 119/792 |
| 2013/0213319 A1 * | 8/2013 | Hoffman | A01K 1/0263 | 119/792 |
| 2014/0069351 A1 * | 3/2014 | Stratton | A01K 27/002 | 119/850 |
| 2015/0020752 A1 * | 1/2015 | Zimmerman | A01K 1/0263 | 119/792 |
| 2015/0125251 A1 * | 5/2015 | Friedberg | A45F 5/1026 | 414/800 |
| 2016/0100554 A1 * | 4/2016 | Maurer | A01K 27/003 | 119/795 |
| 2017/0027308 A1 * | 2/2017 | Christman | A45F 3/14 | |
| 2017/0127814 A1 * | 5/2017 | Mundy | B65G 7/12 | |
| 2019/0124890 A1 * | 5/2019 | Kath | A01K 1/0263 | |
| 2019/0327931 A1 * | 10/2019 | Mohr | A01K 1/029 | |
| 2020/0305394 A1 * | 10/2020 | Stouder | A01K 27/006 | |

* cited by examiner

CONTROL HANDLE FOR AN ANIMAL COLLAR OR HARNESS

TECHNICAL FIELD

The various embodiments disclosed herein relate to animal collars and harnesses. In particular, the various embodiments disclosed herein relate to a control handle for animal collars and harnesses. More particularly, the various embodiments disclosed herein relate to a selectively attachable control handle for converting an animal collar or harness into a working animal collar or harness.

BACKGROUND

Animals, such as dogs, are often required to be directly controlled or restrained by their owner for a variety of reasons, including the safety of others, the safety of the animal, and for the execution of a variety of tasks performed by the animal. Traditionally, a collar and a leash are utilized together to allow the animal's master or handler to have some control over the animal. However, such leashes are generally very long, and don't place the animal's master or handler in a commanding position to have precise control over the animal. Moreover, working animals, such as working dogs, tend to be larger, stronger and trained to execute specialized tasks, such as drug detection, human tracking, personal protection, property protection and the like. Accordingly, a working dog's master or handler is responsible for exercising more direct control over the dog, which is not capable through a traditional leash. For example, working dogs may include guard dogs, tracking dogs, hunting dogs, rescue dogs, therapy dogs, and police dogs for example.

Currently, in order for a handler of a working dog to have more direct control over the dog, a specialized dog collar/harness is required that incorporates a handle for the master or handler to use. That is, such working dog collars/harnesses are configured to integrate a handle directly into that collar itself, and are formed as a unitary or single constructed unit. Such working dog collars and harnesses that have a handle integrated therewith are costly and are prone to requiring frequent replacement given the strength and high energy asserted by the working dog, which is unwanted.

Therefore, it would be desirable to provide a control handle that is configured to be selectively attachable to any traditional animal collar or harness, such as a dog collar, to convert the traditional collar or harness into a working animal collar or harness. It would also be desirable to provide a low-cost solution, whereby a control handle is provided, which can convert a traditional animal collar or harness, such as a dog collar or harness, into a working animal collar or harness that includes a handle for the animal's "handler or master" to grasp.

SUMMARY

It is a first aspect of the various embodiments disclosed herein to provide a control handle for a collar or harness having at least one attachment section configured to be attached around the neck of an animal, the control handle including a loop member; and a retention member attached to the loop member; wherein the retention member is configured to be selectively secured to the at least one attachment section.

It is another aspect of the various embodiments disclosed herein to provide a control handle for a collar or harness having at least one attachment section configured to be attached around the neck of an animal, the control handle including a loop member; and a retention member attached to the loop member at a first position of the retention member, and configured to be selectively retained to the loop member at a second position of the retention member; wherein at least a portion of the loop member is configured to extend under the attachment section to form a pair of grabbing members, with the retention member being configured to extend over the attachment section when the second position of the retention member is retained to the loop member.

BRIEF DESCRIPTION OF THE DRAWINGS

These and other features and advantages of the various embodiments disclosed herein will become better understood with regard to the following description, appended claims, and accompanying drawings, wherein:

DETAILED DESCRIPTION

Figure 1:
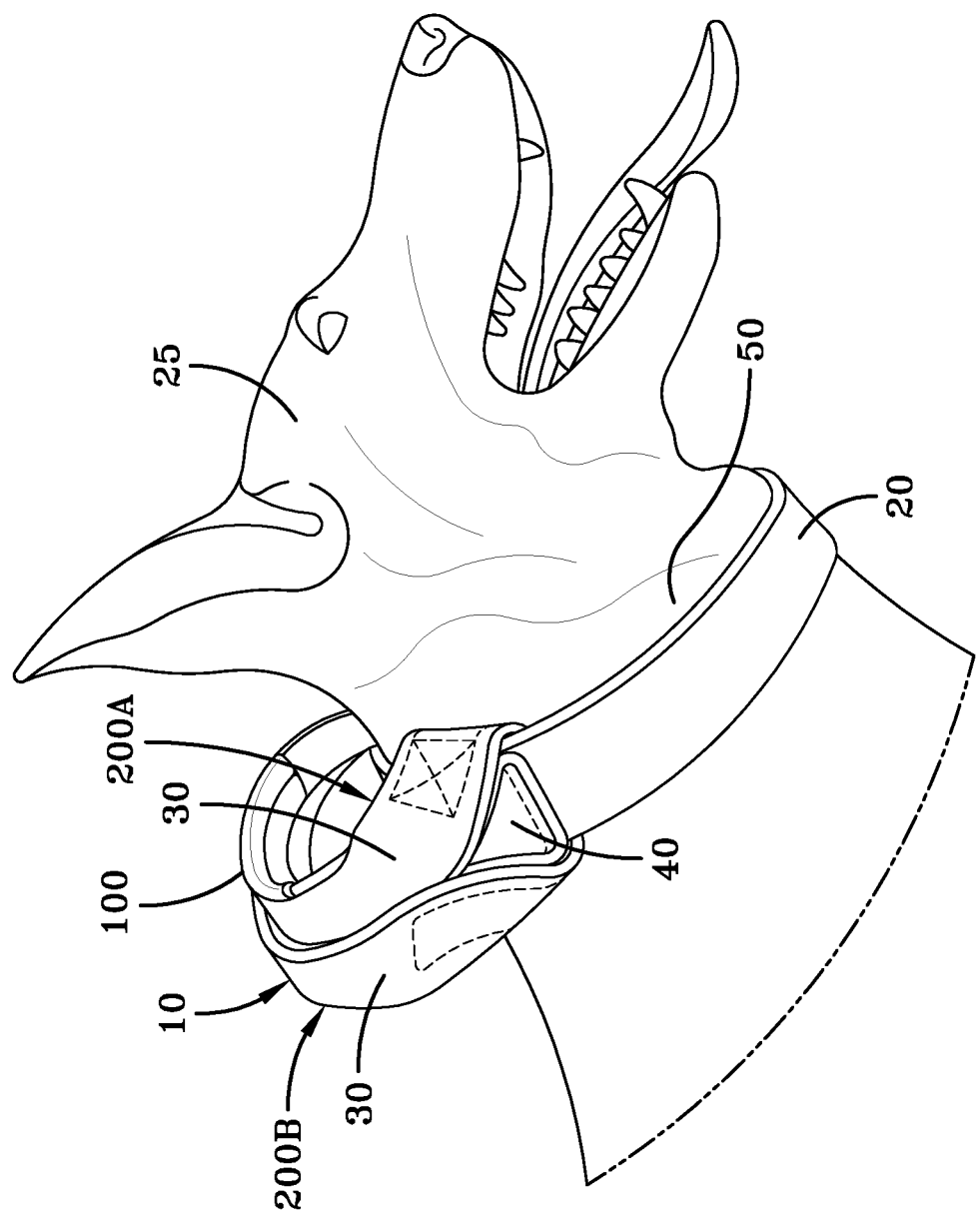
FIG. 1 is an elevational view of a control handle attached to an animal collar worn by a dog in accordance with the concepts of the various embodiments disclosed herein.

Various embodiments of a control handle 10 that is configured for use with a collar 20 that is worn about the neck of an animal 25, such as a dog, are shown in the Figs. It should be appreciated that the control handle 10 includes a loop member 30 having one or more retention members 40 attached thereto. The retention members 40 serve to selectively retain or secure the control handle 10 to the collar 20. It should be appreciated that the handle 10 may be selectively attached to any suitable collar 20 or harness that is worn by animals, such as dogs, whereby the collar or harness includes at least one attachment segment or section that extends around the neck of the animal, and in front of the animal's front shoulders. Furthermore, while the discussion presented herein relates to the use of the control handle 10 for use with dogs, the control handle 10 may be utilized with any animal, including working animals, such as working dogs, and pets. It should be appreciated that one or more of the surfaces of the loop member 30 may include a texturized or rubberized surface to enhance the loop member's 30 grip of the attachment section of the collar 20 or harness.

Specifically, the loop member 30 may be formed from any suitable material, such as fabric, leather, plastic, rubber, as well as materials, such as nylon, and combinations thereof.

The loop member 30 may be configured as a single layer of material or may be formed of multiple individual layers of material that are attached together, such as through stitching, rivets, adhesive and the like. In some embodiments the loop member may be formed of a single layer of material, which has been folded over at one or more edges to form multiple layers. Such layers may be attached to one another through any suitable means of attachment, including stitching, rivets, adhesive and the like.

In some embodiments, the loop member 30 may be formed from multiple segments that are removably or permanently fastened or joined together via a suitable fastener, such as through one or more clips, hooks, snaps, rivets, adhesive and the like.

In other embodiments, the loop member 30 may include a grasping member 100 that is attached to the loop member 30 or made integral with the loop member 30. It should be appreciated that in some embodiments, the grasping member 100 may be at least partially surrounded or enclosed by the loop member 30. In other embodiments, the grasping member 100 may comprise a tube through which the loop member 30 passes, or may comprise a tube or solid section where the loop member 30 completely or partially surrounds or encloses the tube or solid section. Furthermore, the grasping member 100 may extend along only a portion of the length of the loop member 30. It is also contemplated that the grasping member 100 may be positioned substantially opposite to one or more retention members 40.

Figure 2:
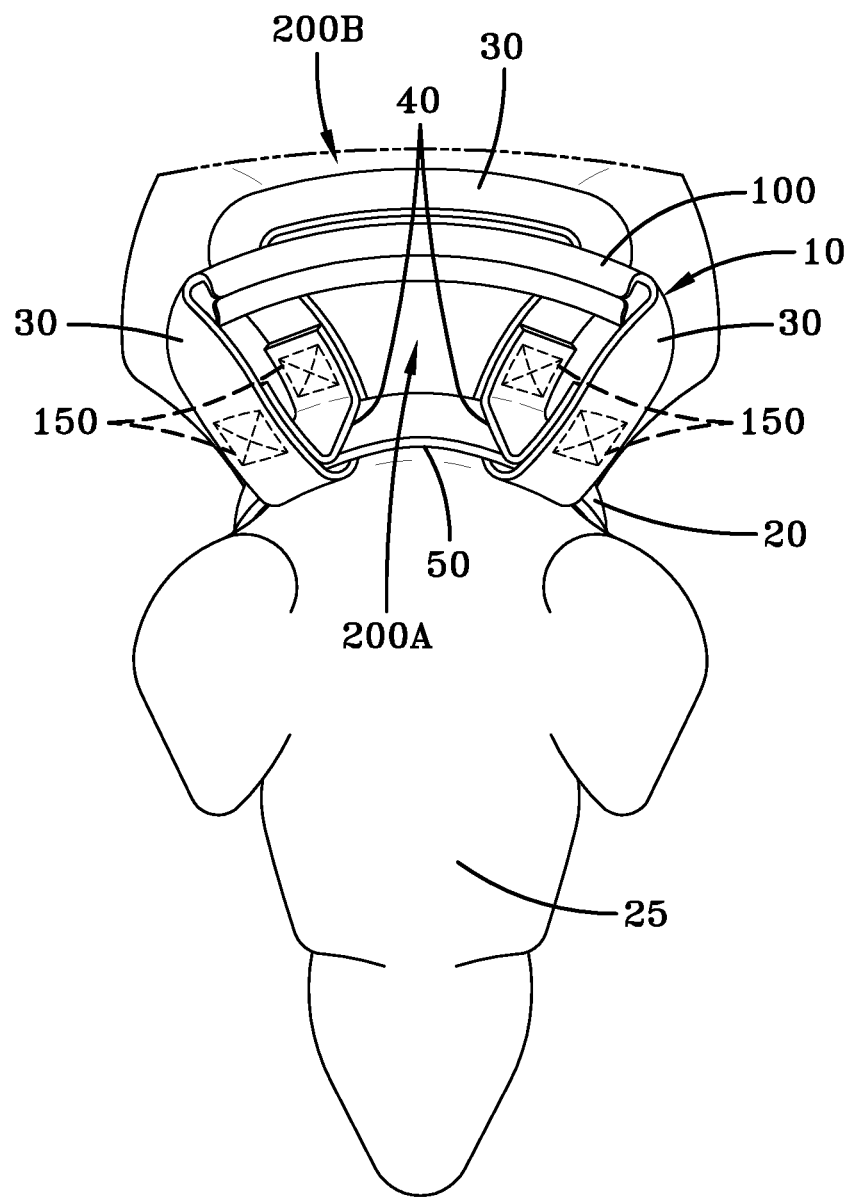
FIG. 2 is a top plan view of the control handle attached to the animal collar worn by the dog in accordance with the concepts of the various embodiments disclosed herein.
Figure 3:
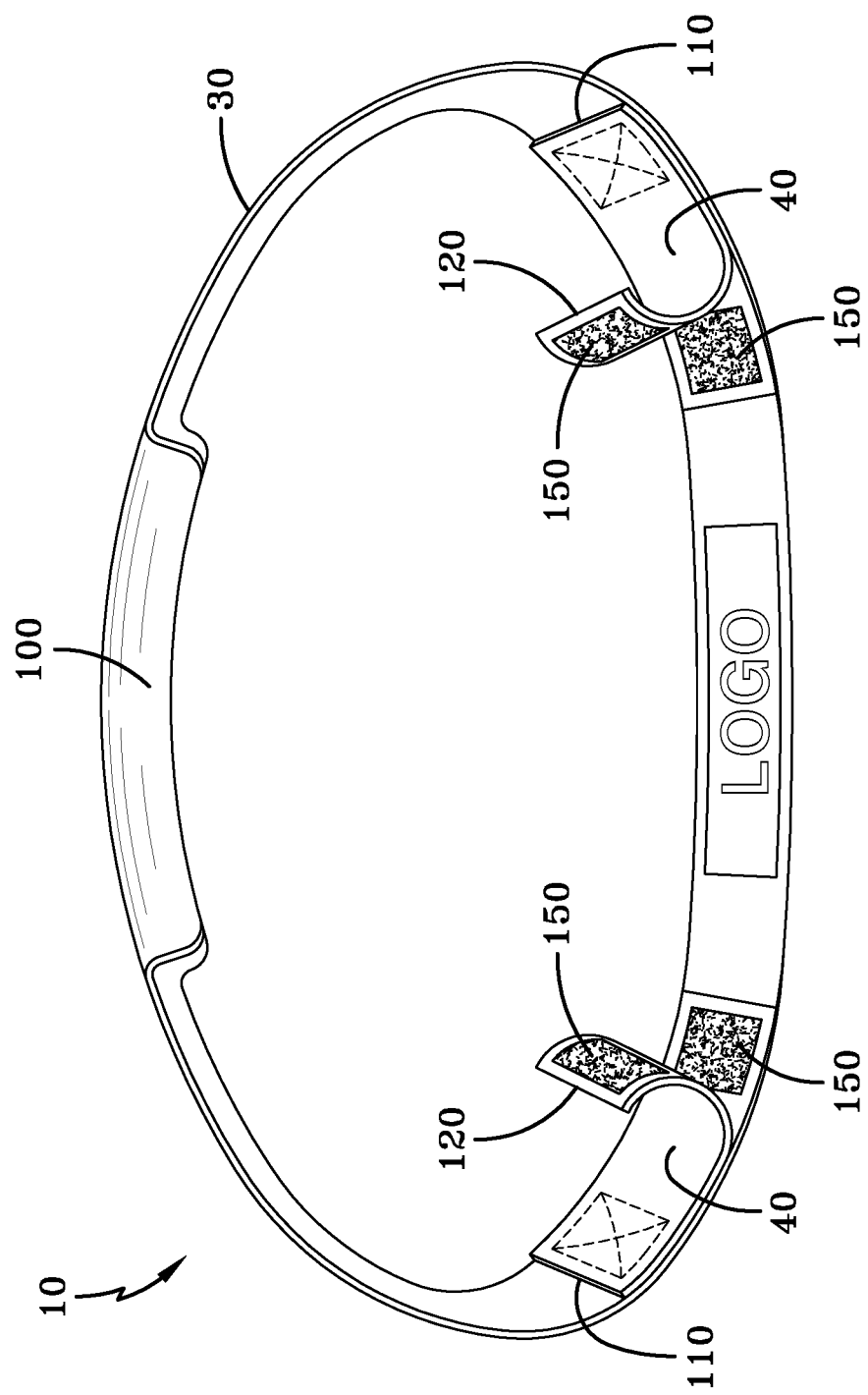
FIG. 3 is a perspective view of the control handle in accordance with the concepts of the various embodiments disclosed herein.

In some embodiments, the retention members 40 comprise a section of material comprising the same material utilized to form the loop member 30 previously discussed. It should be appreciated that in some embodiments of the control handle 10, as shown in FIGS. 1-3, the retention members 40 are configured so that one end 110 is permanently attached to the loop member 30 (such as through stitching, rivets, adhesive or the like), while the other end 120 is free to be selectively/removably attached to the loop member 30 via the various fasteners 150, including but not limited to hook and loop, snaps, hooks, clips (interlocking clips), and the like. As shown in FIGS. 1-3, the fasteners comprise hook and loop material, such as that provided by the brand VELCRO.

Figure 4:
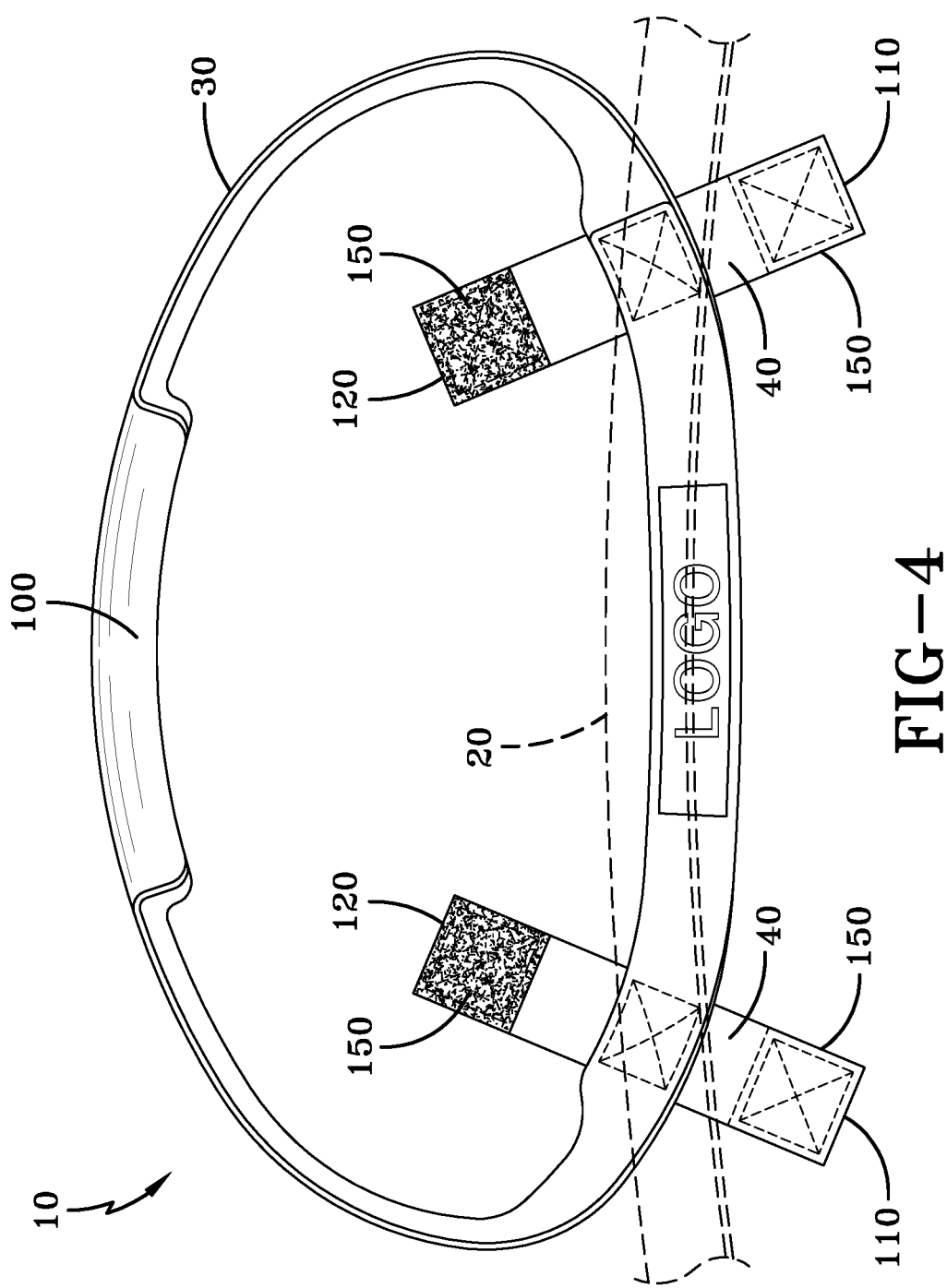
FIG. 4 is a perspective view of another embodiment of the control handle in accordance with the concepts of the various embodiments disclosed herein.

It should be appreciated that in other embodiments of the control handle 10', as shown in FIG. 4, the retention members 40 are positioned at a substantially right angle to the loop member 30, but may be arranged at other angles thereto, such as at an obtuse angle for example. In further embodiments, the ends 110 and 120 of the retention members 40 may be configured to be fastened to each other through any suitable fastener 150, including but not limited to hook and loop, snaps, hooks, clips (interlocking clips), and the like. As shown in the FIG. 4, the fasteners 150 include hook and loop material, such as that provided by the brand VELCRO.

Thus, during operation of the control handle 10, the handler places the loop member 30 underneath the attachment section of the collar 20 or harness positioned around the neck of the animal. The loop member 30 is then pulled away from the attachment section to form a pair of grasping loops 200A and 200B, as shown in FIGS. 1 and 2. It should be appreciated that the grasping member 100 may be positioned on or more of the grasping loops 200A and 200B. In the case of the embodiment of the control handle 10 shown in FIGS. 1-3, the retention members 40 disposed around the collar 20 are attached at ends 120 to the loop member 30 via the fasteners 150. As a result, the loop member 30 of the control handle 30 is attached to the collar 20.

Alternatively, in the case of the embodiment of the control handle 10' shown in FIG. 4, the retention members 40 may be attached around the collar 20, whereby the ends 110,120 of the retention members 40 are secured via fasteners 150 around the loop member 30.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A control handle for a collar or harness for an animal, the control handle comprising:
   a loop member comprising an endless loop for grasping by an individual;
   a plurality of spaced retention members attached to said loop member, said plurality of spaced retention members each having a first attachment point and a second attachment point, said first and second attachment point of each respective retention member being configured to be selectively attached to each other; and
   a grasping member carried by said loop member that has a length that is shorter than a distance between said plurality of retention members;
   wherein said loop member encircles an attachment section of the collar or harness that extends around the neck of the animal when said first attachment point of each said retention member is attached to said second attachment point.

2. The control handle of claim 1, wherein said loop member is formed of fabric, leather, polymeric material or nylon.

3. The control handle of claim 1, wherein said grasping member comprises a tube.

4. The control handle of claim 3, wherein said plurality of retention members include a first and a second end, such that said lateral edges of said loop member are positioned therebetween.

5. The control handle of claim 4, wherein said first attachment point is proximate to said first end and said second attachment point is proximate to said second end of each said retention member, wherein said first and second attachment points include hook and loop material, snaps, or interlocking clips.

6. The control handle of claim 1, wherein said plurality of retention members are positioned at a substantially right angle to said loop member.

7. A control handle for a collar or harness for an animal, the control handle comprising:
   a loop member comprising an endless loop; and
   a plurality of retention members attached to said loop member, said plurality of retention members each having a first attachment point and a second attachment point, said first and second attachment point of each respective retention member being configured to be selectively attached to each other;
   wherein a portion of said loop member is configured to extend under an attachment section of the animal collar or harness that extends around the neck of the animal to form a pair of grasping loops for grasping by an individual when said first attachment point of said retention member is attached to said second attachment point of each said retention member.

8. The control handle of claim 7, wherein said loop member is formed of fabric, leather, polymeric material or nylon.

9. The control handle of claim 7, wherein said plurality of retention members include a first and a second end, such that said lateral edges of said loop member are positioned therebetween.

10. The control handle of claim 7, further comprising a grasping member carried by said loop member.

11. The control handle of claim 10, wherein said grasping member is at least partially enclosed by said loop member.

12. The control handle of claim 11, wherein said attachment point and said second attachment point of said retention member are selectively attached by a fastener.

13. The control handle of claim 12, wherein said fastener includes hook and loop material, snaps, or interlocking clips.

14. The control handle of claim 10, wherein said grasping member includes a rubberized section.

15. The control handle of claim 7, wherein said plurality of retention members are positioned at a substantially right angle to said loop member.

\* \* \* \* \*